(12) United States Patent  
Doman et al.

(10) Patent No.: US 8,647,211 B2
(45) Date of Patent: Feb. 11, 2014

(54) TORQUE LIMITER

(75) Inventors: Yasunori Doman, Hirakata (JP); Takashi Harada, Shijyonawate (JP); Yoshinari Yoshimura, Ikoma (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 13/318,454

(22) PCT Filed: Apr. 15, 2010

(86) PCT No.: PCT/JP2010/056774
§ 371 (c)(1),
(2), (4) Date: Nov. 1, 2011

(87) PCT Pub. No.: WO2010/143468
PCT Pub. Date: Dec. 16, 2010

(65) Prior Publication Data
US 2012/0046114 A1   Feb. 23, 2012

(30) Foreign Application Priority Data

Jun. 11, 2009 (JP) ................... 2009-140027
Jun. 11, 2009 (JP) ................... 2009-140028
Jun. 11, 2009 (JP) ................... 2009-140031

(51) Int. Cl.
F16D 7/02 (2006.01)
(52) U.S. Cl.
USPC ............................ 464/46; 464/68.4; 464/68.6
(58) Field of Classification Search
USPC ....... 464/45–48, 68.1, 68.4, 68.6; 192/107 C, 192/204, 206
See application file for complete search history.

(56) References Cited

U.S. PATENT DOCUMENTS

| 2,247,690 | A | * | 7/1941 | Nutt ......................... 192/107 C |
| 3,610,383 | A | * | 10/1971 | Rosteo |
| 4,274,524 | A | * | 6/1981 | Nakane .................... 464/68.4 X |
| 4,401,426 | A | * | 8/1983 | Heidenreich ............... 464/48 X |
| 5,362,276 | A | * | 11/1994 | Fuehrer et al. ............ 464/68.4 X |
| 6,085,886 | A | | 7/2000 | Fukuda |
| 7,238,111 | B2 | * | 7/2007 | Kintou et al. ................... 464/46 |
| 2003/0087704 | A1 | | 5/2003 | Takeuchi et al. |

FOREIGN PATENT DOCUMENTS

| JP | 63-280937 A | 11/1988 |
| JP | 11-325113 A | 11/1999 |
| JP | 2002-195290 A | 7/2002 |
| JP | 2003-194095 A | 7/2003 |
| JP | 2008-280033 A | 11/2008 |
| JP | 2008-303995 A | 12/2008 |
| SU | 250621 | * 8/1969 ...................... 464/48 |

* cited by examiner

*Primary Examiner* — Gregory Binda
(74) *Attorney, Agent, or Firm* — Global IP Counselors, LLP (57) ABSTRACT

The torque limiter includes a flywheel, a clutch plate, a spline hub, a clutch disc assembly and a transmission torque limiting part. The flywheel includes a friction coupling surface. The clutch plate includes plural axial through holes. Plural friction members are respectively attached to the through holes. The spline hub can be engaged with a transmission-side shaft. The clutch disc assembly circumferentially elastically couples the clutch plate and the spline hub. The transmission torque limiting part limits torque to be transmitted from the flywheel to the transmission-side shaft while the friction members are interposed and held between the transmission torque limiting part and the friction coupling surface of the flywheel.

12 Claims, 10 Drawing Sheets

TORQUE LIMITER

CROSS-REFERENCE TO THE RELATED APPLICATIONS

This U.S. National Stage Application claims priority under 35 U.S.C. §119(a) to Japanese Patent Application Nos. 2009-140027, 2009-140028, and 2009-140031, all of which were filed on Jun. 11, 2009. The entire content of Japanese Patent Application Nos. 2009-140027, 2009-140028, and 2009-140031 is hereby incorporated herein by reference.

TECHNICAL FIELD

The present invention relates to a torque limiter, particularly to, a torque limiter configured to limit torque transmitted from a crankshaft of an engine to a transmission-side shaft.

BACKGROUND ART

Some vehicles are provided with a torque limiter for preventing components such as a transmission from being damaged or broken by excessive torque transmitted thereto from an engine. The torque limiter is normally disposed between the engine and the transmission for limiting torque transmitted thereto. In the torque limiter, for instance, at least one friction facing is interposed and held between a pair of plates at a predetermined holding force. Further, the input side of the torque limiter is coupled to engine-side members (e.g., a flywheel), while the output side of the torque limiter is coupled to transmission-side components (e.g., an input shaft).

The torque limiter of the aforementioned type includes a drive plate, a transmission torque limiting part, a driven-side member and a damper mechanism (see e.g., Patent Literature 1). The drive plate includes a friction coupling portion on the radial outer portion thereof. The transmission torque limiting part has a structure that the friction coupling portion of the drive plate is interposed and held between a pair of plates at a predetermined holding force. The driven-side member is coupled to an input shaft of a transmission. The damper mechanism is disposed among the aforementioned components. In the torque limiter, the paired plates that the friction coupling portion is interposed and held therebetween (or a damper cover disposed radial outwards of the friction coupling portion) are coupled to the flywheel.

In the torque limiter, engine torque is transmitted from the flywheel to the drive plate via the friction coupling portion and is further transmitted to the driven-side member and the input shaft of the transmission via the damper mechanism. When the engine torque then exceeds a predetermined level, slippage occurs between the plate and the friction coupling portion. Excess of the torque, exceeding the limit imposed by the transmission torque limiting part, is accordingly prevented from being transmitted to the transmission. Therefore, the transmission can be prevented from being damaged or broken by the excessive torque.

Japan Laid-open Patent Application Publication No. JP-A-2006-017226 (Patent Literature) is an example of the related art.

SUMMARY

Technical Problems

In the well-known torque limiters, a friction member is fixed to a cushioning plate fixed to a clutch plate as similarly seen in the normal clutch discs for the automobiles. Further, the following exemplary methods have been employed for fixing the friction member to the cushioning plate: (a) rivet swaging; (b) adhesion by means of an adhesive material; and (c) integration by means of molding.

In the rivet swaging as an exemplary fixing method, however, it is required to prepare rivets and form counter bores in the friction member for preventing the heads of the rivets from being protruded out of the surface of the friction member. Further in the rivet swaging, the friction (burn-off) length of the friction member is reduced. Further, in the adhesion by means of an adhesive material as an exemplary fixing method, the number of processing steps is increased and this results in cost increase. Yet further, in the integration by means of molding as an exemplary fixing method, the available cushioning shapes are limited and its cost is high.

Further, the well-known torque limiters as described above are normally fixed to the flywheel by means of bolts. The flywheel has been preliminarily attached to the axial end of the crankshaft of the engine. In other words, the flywheel is firstly fixed to the axial end of the crankshaft and the torque limiter is then fixed to the flywheel.

As described above, the well-known power transmission devices with the torque limiter require a flywheel attachment step and a torque limiter attachment step. Further, the torque limiter is coupled to the input shaft of the transmission through a spline joint portion formed on the driven-side member. Therefore, an axis misalignment between the spline joint portion and the flywheel is required to fall in a predetermined range under the condition that the torque limiter is secured to the flywheel. It is herein required to provide either a spigot ferrule or a pair of a knock pin and a pin hole for appropriately positioning both of the torque limiter and the flywheel. Further, an axis-aligning tool for radial positioning is required to be used for setting the axis misalignment between the flywheel and the spline joint portion of the driven-side member to fall in a predetermined range. The axis-aligning tool is herein fitted into, for instance, the spline coupling portion and the holes of the crankshaft.

It is an object of the present invention to provide a torque limiter achieving fixation of a friction member with a simple structure at a low cost.

It is another object of the present invention to provide a torque limiter that can be easily attached to the engine and does not require an axis-alignment operation for radial positioning thereof after being attached to the engine.

Solution to Problems

In the clutch disc assemblies embedded in the clutch devices for automobiles and so forth, the aforementioned well-known methods of fixing the friction member are used for switching the clutch devices between a turned-on state (i.e., permission of power transmission) and a turned-off state (prevention of power transmission). In the torque limiters, by contrast, it is not required to turn on and off (i.e., activate and deactivate pressure of) the friction member. In addition, it is not required to axially fix the friction member. Further, the amount of abrasion of the friction members in the torque limiters is less than that of the friction members to be used in the clutch devices for automobiles and so forth.

In view of the above, the following torque limiters of the present invention have been produced. A torque limiter according to a first aspect of the present invention is a torque limiter configured to limit a torque to be transmitted from an engine-side member to a transmission-side shaft. The torque limiter includes a drive member, a friction coupling plate, an output-side member, a damper mechanism and a transmission torque limiting part. The drive member is coupled to the engine-side member and includes a friction coupling surface. The friction coupling plate includes a plate body and a single or plurality of friction members. The plate body includes a single or plurality of holes axially penetrating therethrough. Further, the plate body axially has a first thickness. The single or plurality of friction members is attached to the single or plurality of holes of the friction coupling plate on a one-to-one basis. Further, the single or plurality of friction members respectively has a second thickness greater than the first thickness. The output-side member is allowed to be engaged with the transmission-side shaft. The damper mechanism circumferentially elastically couples the friction coupling plate and the output-side member. The transmission torque limiting part is configured to limit a torque to be transmitted from the drive member to the transmission-side shaft while the single or plurality of friction members being interposed and held between the transmission torque limiting part and the friction coupling surface of the drive member.

According to the torque limiter of the first aspect of the present invention, the torque transmitted to the drive member is transmitted to the output-side member through the single or plurality of friction members of the friction coupling plate and is further transmitted to the transmission-side shaft. When excessive torque is inputted from the engine side, the transmitted torque is limited at the single or plurality of friction members and the periphery thereof by the action of the transmission torque limiting part.

Further, the single or plurality of friction members is herein respectively fixed to the single or plurality of holes of the friction coupling plate on a one-to-one basis. Accordingly, the single or plurality of friction coupling members can be fixed to the plate at a lower cost than the well-known fixation method using rivets, adhesive material or molding. Yet further, the torque limiter can be formed with a simple structure. In particular, the axial size of the torque limiter can be reduced.

A torque limiter according to a second aspect of the present invention relates to the torque limiter according to the first aspect of the present invention. In the torque limiter, the damper mechanism includes an input-side plate, an output-side plate and a plurality of torsion springs. The output-side plate is coupled to the transmission-side shaft. The plurality of torsion springs is disposed between the input-side plate and the output-side plate for elastically coupling the input-side plate and the output-side plate. Further, the friction coupling plate is a radial outer portion of the input-side plate.

According to the torque limiter of the second aspect of the present invention, the input-side plate of the damper mechanism and the friction coupling plate are integrated as a single member. Therefore, the torque limiter can be formed with a simpler structure. In particular, the axial size of the torque limiter can be more reliably reduced.

A torque limiter according to a third aspect of the present invention relates to the torque limiter according to the first aspect of the present invention. In the torque limiter, the holes and the friction members of the friction coupling plate are respectively circumferentially disposed at equal angular intervals.

A torque limiter according to a fourth aspect of the present invention relates to the torque limiter according to the third aspect of the present invention. In the torque limiter, each of the friction members is press-fitted in the corresponding one of the holes without producing a circumferential clearance therein.

A torque limiter according to a fifth aspect of the present invention relates to the torque limiter according to the first aspect of the present invention. In the torque limiter, the transmission torque limiting part includes a pressure ring pressing the single or plurality of friction members onto the friction coupling surface of the drive member. Further, at least either of the pressure ring and the friction coupling surface of the drive member includes a protrusion disposed radial inwards of the single or plurality of friction members. The protrusion is protruded closer to the corresponding one of faces of the friction coupling plate.

According to the torque limiter of the fifth aspect of the present invention, the protrusion, protruded from at least either of the drive member and the pressure ring, is disposed radial inwards of the single or plurality of friction members. With the single or plurality of protrusions, foreign substance such as mud and water can be inhibited from entering the friction material side.

A torque limiter according to a sixth aspect of the present invention relates to the torque limiter according to the first aspect of the present invention. The torque limiter further includes an urging member disposed between the drive member and the friction coupling plate for urging the friction coupling plate in a direction away from the drive member.

According to the torque limiter of the sixth aspect of the present invention, the axial movement of the friction coupling plate is inhibited. Therefore, it is possible to inhibit abrasion and production of abnormal sounds in the respective members that may be caused by the axial movement (i.e., vibration) of the friction coupling plate.

A torque limiter according to a seventh aspect of the present invention relates to the torque limiter according to the first aspect of the present invention. In the torque limiter, the transmission limiting part includes a pressure ring, a cone spring and a support member. The pressure ring holds the single or plurality of friction members with the friction coupling surface of the drive member while the single or plurality of friction members is interposed therebetween. The cone spring is a ring-shaped member including a radial inner portion pressing the pressure ring towards the drive member. The support member is attached to the drive member for supporting a radial outer portion of the cone spring.

A torque limiter according to an eighth aspect of the present invention is a torque limiter configured to limit a torque to be transmitted from a crankshaft of an engine to a transmission-side shaft. The torque limiter includes a disc-shaped drive member, an input-side member, an output-side member, a damper mechanism and a transmission torque limiting part. The disc-shaped drive member includes a friction coupling surface. The disc-shaped drive member is allowed to be coupled to an end of the crankshaft. The disc-shaped drive member includes a plurality of attachment holes circumferentially aligned on a radial inner portion thereof. The attachment holes allow a plurality of fasteners for fixation to be inserted therein on a one-to-one basis. The input-side member includes a friction member on a radial outer portion thereof. The output-side member includes an engaging portion allowed to be engaged with the transmission-side shaft. The damper mechanism circumferentially elastically couples the input-side member and the output-side member. The transmission torque limiting part is configured to limit a toque to be transmitted from the drive member to the transmission-side shaft while the friction member of the input-side member is interposed and held between the transmission torque limiting part and the friction coupling surface of the drive member.

According to the torque limiter of the eighth aspect of the present invention, the torque transmitted to the drive member is transmitted to the output-side member through the friction member of the input-side member and is further transmitted to the transmission-side shaft. When excessive torque is inputted from the engine side, the transmitted torque is limited at the friction member and the periphery thereof by the action of the transmission torque limiting part.

Further, the drive member (e.g., a flywheel) has been preliminarily embedded in the torque limiter. Therefore, the entire torque limiter, including the drive member and the output-side member, can be attached onto the end of the crankshaft while the axis misalignment between the drive member and the engaging portion of the output-side member is set to be in a predetermined range. The attachment work will be thereby easily done. Further, a work is not required for aligning the axes of the crankshaft and the output-side member.

A torque limiter according to a ninth aspect of the present invention relates to the torque limiter according to the eighth aspect of the present invention. In the torque limiter, the drive member includes a positioning portion for executing radial positioning thereof with respect to the crankshaft.

According to the torque limiter of the ninth aspect of the present invention, the axis of the drive member can be aligned with that of the crankshaft by means of the positioning portion of the drive member. Therefore, no structure and no work are required for aligning the axes of the engaging portion of the output-side member and the crankshaft.

A torque limiter according to a tenth aspect of the present invention relates to the torque limiter according to the ninth aspect of the present invention. In the torque limiter, the engaging portion of the output-side member has an axis misalignment of less than or equal to 1.0 mm with respect to the positioning portion of the drive member.

A torque limiter according to an eleventh aspect of the present invention relates to the torque limiter according to the eighth aspect of the present invention. In the torque limiter, the input-side member and the damper mechanism are disposed radial outwards of a pitch circle diameter of the attachment holes of the drive member. Further, no other member excluding the output-side member is disposed radial inwards of the pitch circle diameter.

According to the torque limiter of the eleventh aspect of the present invention, members are concentratedly disposed on the radial outer side while no member is disposed on the radial inner side. Therefore, the torque limiter can be formed with a lightweight structure. Further, the torque limiter can obtain relatively large inertia of moment in spite of the lightweight structure thereof.

A torque limiter according to a twelfth aspect of the present invention relates to the torque limiter according to the eighth aspect of the present invention. The torque limiter further includes the fasteners for fixation inserted into the attachment holes of the drive member on a one-to-one basis.

According to the torque limiter of the twelfth aspect of the present invention, the fixing fasteners such as bolts have been preliminarily attached to the drive member. Therefore, no space is required for inserting the fixing fasteners into the attachment holes of the drive member in the post-processing steps. Accordingly, the axial size of the toque limiter can be reduced.

A torque limiter according to a thirteenth aspect of the present invention relates to the torque limiter according to the twelfth aspect of the present invention. In the torque limiter, the output-side member includes a boss and a flange. The boss has a spline joint portion in a center part thereof. The flange is extended radial outwards from the boss. Further, the flange includes a tool inserting hole allowing a tightening tool to be inserted therein for fixing the fasteners for fixation respectively inserted into the attachment holes of the drive member to the crankshaft by means of the tightening tool.

A torque limiter according to a fourteenth aspect of the present invention is a torque limiter configured to limit a torque to be transmitted from a crankshaft of an engine to a transmission-side shaft. The torque limiter includes a disc-shaped drive member, a disc-shaped input-side member, an output-side member, a damper mechanism and a transmission torque limiting part. The disc-shaped drive member includes a friction coupling surface on a radial outer portion thereof. The disc-shaped drive member is allowed to be coupled to an end of the crankshaft. The disc-shaped input-side member includes a friction member on a radial outer portion thereof. The output-side member includes an engaging portion allowed to be engaged with the transmission-side shaft. The damper mechanism circumferentially elastically couples the input-side member and the output-side member. The transmission torque limiting part is configured to limit a torque to be transmitted from the drive member to the transmission-side shaft while the friction member of the input-side member is interposed and held between the transmission torque limiting part and the friction coupling surface of the drive member. Further, the drive member includes an axially extended abutment portion on the radial outer portion thereof for executing radial positioning thereof. An outer peripheral edge of the input-side member is abutted to the abutment portion of the drive member for executing radial positioning of the input-side member, the output-side member and the damper mechanism.

According to the torque limiter of the fourteenth aspect of the present invention, the torque transmitted to the drive member is transmitted to the output-side member through the friction member of the input-side member and is further transmitted to the transmission-side shaft. When excessive torque is inputted from the engine side, the transmitted torque is limited at the friction member and the periphery thereof by the action of the transmission torque limiting part.

Further, the drive member (e.g., a flywheel) has been herein preliminarily embedded in the torque limiter. Therefore, the entire torque limiter, including the drive member and the output-side member, can be attached onto the end of the crankshaft while the axis misalignment between the drive member and the engaging portion of the output-side member is set to be in a predetermined range. The attachment work will be thereby easily done. Further, no work is required for aligning the axes of the crankshaft and the output-side member.

Yet further, the outer peripheral edge of the input-side member is abutted to the abutment portion of the drive member for executing radial positioning of the respective members. Therefore, the respective members (e.g., the input-side member) are not required to be extended to the inner radial part of the drive member. As a result, a small number of members are disposed on a transmission-side part of the inner radial part of the drive member. Accordingly, it is possible to easily form the structure for fixing the entire torque limiter including the drive member to the engine-side member.

A torque limiter according to a fifteenth aspect of the present invention relates to the torque limiter according to the fourteenth aspect of the present invention. In the torque limiter, the drive member includes a tubular inner peripheral surface axially extended. Further, the abutment portion for executing radial positioning is formed on the tubular inner peripheral surface.

According to the torque limiter of the fifteenth aspect of the present invention, the abutment portion is formed on the tubular inner peripheral surface formed in the drive member. Further, the outer peripheral edge of the input-side member is abutted to the abutment portion. Therefore, radial positioning of the input-side member can be done with a simple structure.

A torque limiter according to a sixteenth aspect of the present invention relates to the torque limiter according to the fifteenth aspect of the present invention. In the torque limiter, the tubular inner peripheral surface includes a first engaging portion on an axial transmission side of the abutment portion. Further, the transmission toque limiting part includes a pressure ring, a cone spring and a support member. The pressure ring holds the friction member with the friction coupling surface of the drive member while the friction member is interposed therebetween. The cone spring is a ring-shaped member including a radial inner portion pressing the pressure ring towards the drive member. The support member is attached to the drive member for supporting a radial outer portion of the cone spring. Yet further, the pressure ring includes a second engaging portion on a radial outer portion thereof. The second engaging portion is engaged with the first engaging portion for preventing the pressure ring from rotating relative to the drive member.

DETAILED DESCRIPTION OF THE EXEMPLARY EMBODIMENTS

Entire Structure

Figure 1:
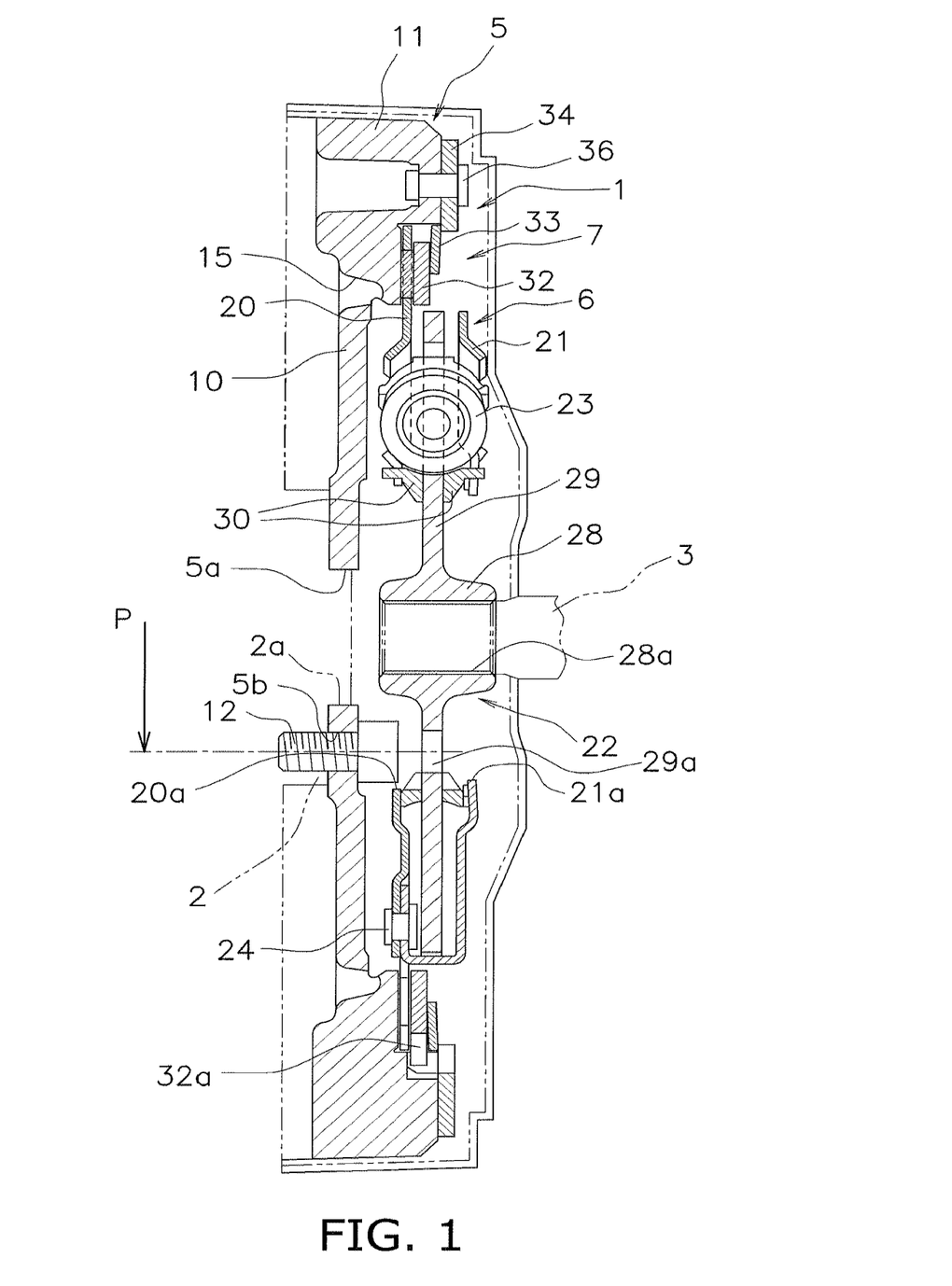
FIG. 1 is a cross-sectional view of a torque limiter with a flywheel according to an exemplary embodiment of the present invention.
Figure 2:
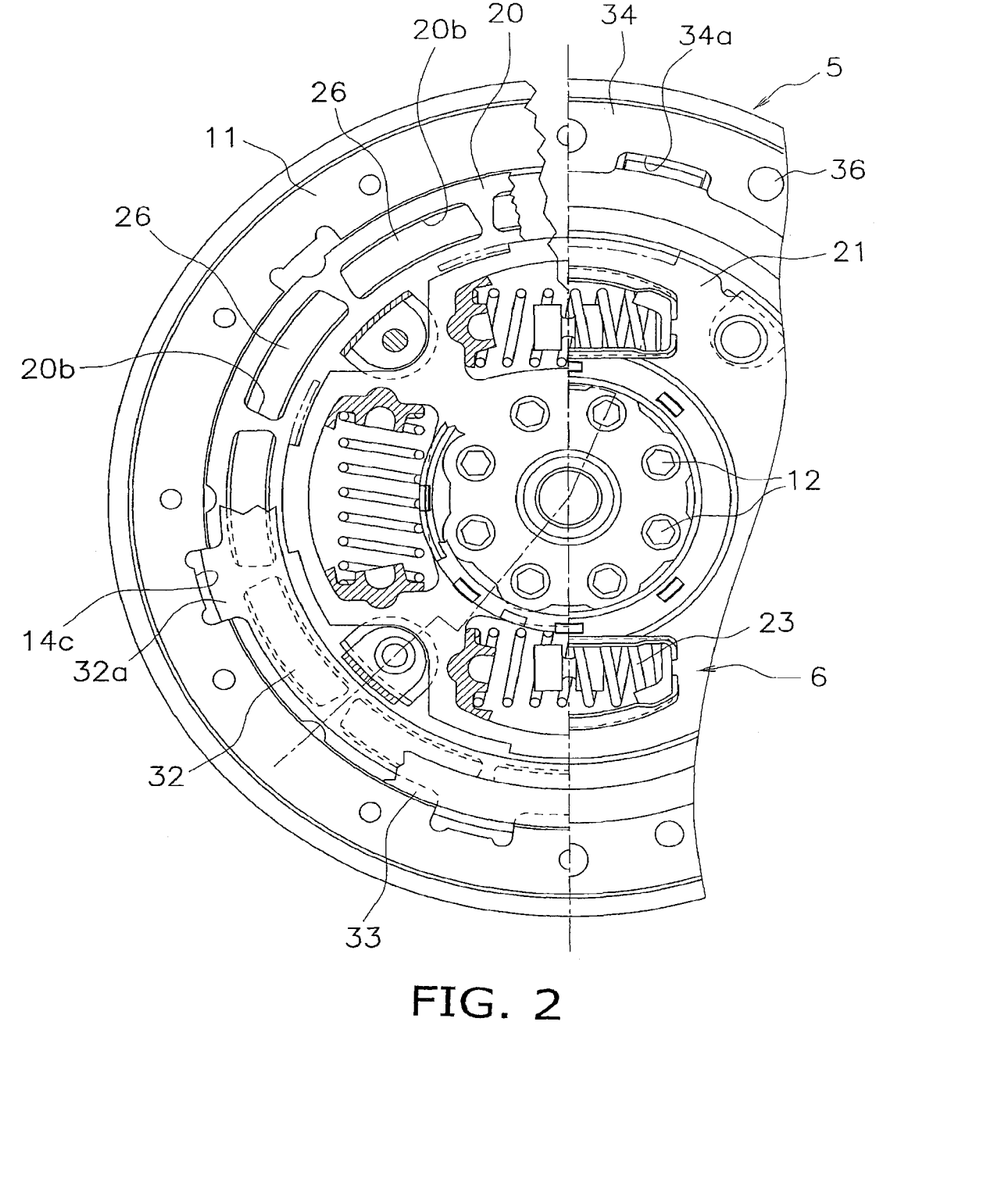
FIG. 2 is a front view of the torque limiter. Arrows in FIG. 2 indicates where sections of the views in FIGS. 1 and 3.

FIG. 1 illustrates a cross-sectional view of a torque limiter with a flywheel according to an exemplary embodiment of the present invention. Further, FIG. 2 is a front view of a part of the torque limiter with a flywheel. Although not being illustrated in FIG. 1, the structure assumed in FIG. 1 is that an engine is disposed on the left side of the torque limiter while a transmission is disposed on the right side of the torque limiter.

A torque limiter 1 is disposed between a crankshaft 2 of the engine and an input shaft 3 of the transmission for limiting torque to be transmitted from the engine to the transmission. Further, the torque limiter 1 includes a flywheel 5 as a drive member, a clutch disc assembly 6 and a transmission torque limiting part 7 including a part of the clutch disc assembly 6.

Flywheel

The flywheel 5 is a disc-shaped member. The flywheel 5 includes a hole 5a and a disc portion 10. The hole 5a is formed in the center of the flywheel 5, while the disc portion 10 is formed from the radial inner part to the radial intermediate part of the flywheel 5. Further, the flywheel 5 includes a mass portion 11 on the radial outside of the disc portion 10. The hole 5a, formed in the center of the flywheel 5, is fitted onto a spigot ferrule 2a formed on the axial end face of the crankshaft 2. Accordingly, the flywheel 5 and the crankshaft 2 are appropriately positioned in the radial direction.

The disc portion 10 includes a plurality of through holes 5b circumferentially aligned on the radial inner part thereof. A plurality of bolts 12 is respectively inserted into the through holes 5b on a one-to-one basis. The bolts 12 are respectively screwed into a plurality of screw holes of the crankshaft 2 on a one-to-one basis. Accordingly, the flywheel 5 can be fixed to the axial end face of the crankshaft 2. Further, the axial thickness of the entire disc portion 10 is roughly constant in the radial direction. It should be noted that each bolt 12 is a hexagon socket bolt including a hexagon socket on the head thereof for allowing a tightening tool to be inserted therein.

The mass portion 11 has an axial thickness greater than that of the disc portion 10. As illustrated in an enlarged view of FIG. 3, the mass portion 11 includes an accommodation portion 14 on the transmission-side face thereof. The accommodation portion 14 is recessed towards the engine. The accommodation portion 14 includes a radial positioning surface 14a on the outer periphery thereof as an axially extended tubular inner peripheral surface. Further, the accommodation portion 14 includes a friction coupling surface 14b on a part corresponding to the bottom surface thereof (i.e., an engine-side wall surface).

Further, the flywheel 5 includes a plurality of recesses 15 in a boundary part between the disc portion 10 and the mass portion 11 on the engine-side face thereof. The recesses 15 are recessed towards the transmission. The recesses 15 are aligned in the circumferential direction of the flywheel 5. Each of the recesses 15 is formed in a circular-arc shape. Yet further, the flywheel 5 includes a plurality of through holes 16 bored from the face thereof opposite to the engine-side face thereof. The through holes 16 are respectively arranged to be matched with the recesses 15 on a one-to-one basis. The through holes 16 penetrate to the recesses 15. It should be noted that each through hole 16 is herein shaped for preventing the engine side from being seen from the transmission side in the axial direction. More specifically, the inner diameter of the friction coupling surface 14b is less than the outermost diameter of the disc portion 10 in the part that the through holes 16 are formed.

Clutch Disc Assembly

The clutch disc assembly 6 mainly includes a pair of a clutch plate 20 and a retaining plate 21, a spline hub 22 and a plurality of torsion springs (damper mechanism) 23 elastically coupling the spline hub 22 and the pair of the clutch plate 20 and the retaining plate 21

Each of the clutch plate 20 and the retaining plate 21 is an annular member made of, for instance, a sheet metal. The clutch plate 20 and the retaining plate 21 are axially separated at a predetermined interval. The clutch plate 20 is disposed on the engine side, while the retaining plate 21 is disposed on the transmission side. The radial outer portion of the retaining plate 21 is partially bent towards the clutch plate 20 and is further bent radial inwards. The radial-inwardly bent portions of the retaining plate 21 are respectively fixed to the radial outer portion of the clutch plate 20 by means of rivets 24. Accordingly, the clutch plate 20 and the retaining plate 21 are configured to be unitarily rotated.

Further, each of the clutch plate 20 and the retaining plate 21 includes four window holes on the radial outer portion thereof. The window holes are disposed at equal intervals along the rotary direction. The window holes respectively supports the torsion springs 23 on a one-to-one basis. Further, the clutch plate 20 includes a hole 20a in the center part thereof, while the retaining plate 21 includes a hole 21a in the center part thereof. The diameters of the holes 20a and 21a of the plates 20 and 21 are both greater than an attachment pitch circle P (see FIG. 1) of the bolts 12 for fixing the flywheel 5 to the crankshaft 2. Therefore, no other component excluding the spline hub 22 is disposed radial inwards of the clutch disc assembly 6.

The outer periphery of the clutch plate 20 is extended to the friction coupling surface 14b of the flywheel 5. The outer peripheral edge of the clutch plate 20 is disposed adjacent to the radial positioning surface 14a of the accommodation portion 14 of the flywheel 5. The clutch plate 20 is appropriately positioned in the radial direction by the radial positioning surface 14a.

Further, a plurality of friction members 26 is disposed on the radial outer portion of the clutch plate 20. In other words, the radial outer portion of the clutch plate 20 functions as a friction coupling plate. More specifically, the clutch plate 20 includes a plurality of circular-arc holes 20b on the radial outer portion thereof, as illustrated in FIG. 2. The circular-arc holes 20b are aligned along the circumferential direction of the clutch plate 20. The circular-arc shaped friction members 26 are respectively attached to the circular-arc holes 20b on a one-to-one basis. Specifically, the circumferential end surfaces of each friction member 26 are press-fitted and attached into a corresponding one of the holes 20b. It should be noted that a clearance is produced between each friction member 26 and a corresponding one of the holes 20b in a radial direction. Each friction member 26 has a thickness greater than that of the clutch plate 20.

The spline hub 22 includes a boss 28 and a hub flange 29. The boss 28 is an axially extended tubular portion, whereas the hub flange 29 is a disc-shaped portion extended from the boss 28 in the radial direction. The boss 28 and the hub flange 29 are integrally formed. The boss 28 includes a spline hole 28a in the inner periphery thereof. The input shaft 3 of the transmission is fitted into the spline hole 28a. On the other hand, the hub flange 29 includes a plurality of notches aligned along the rotary direction. The notches respectively accommodate the torsion springs 23 on a one-to-one basis. The hub flange 29 includes a plurality of holes 29a in the radial intermediate part thereof. The holes 29a are positioned to be matched with the bolts 12. A tool for tightening the bolts 12 is herein allowed to be inserted into the holes 29a. It should noted in the present exemplary embodiment that the axis misalignment of the spline hole 28a with respect to the spigot ferrule 2a of the crankshaft 2 is reduced to be equal to or less than 1.0 mm, and specifically, falls in a range of 0.2 mm to 0.3 mm.

Further, one of bushes 30 is disposed between the hub flange 29 of the spline hub 22 and the clutch plate 20, while the other of the bushes 30 is disposed between the hub flange 29 of the spline hub 22 and the retaining plate 21. The bushes 30 are respectively fixed to the clutch plate 20 and the retaining plate 21 are configured to produce hysteresis torque in relative rotation to the faces of the hub flange 29.

Transmission torque limiting part

Figure 3:
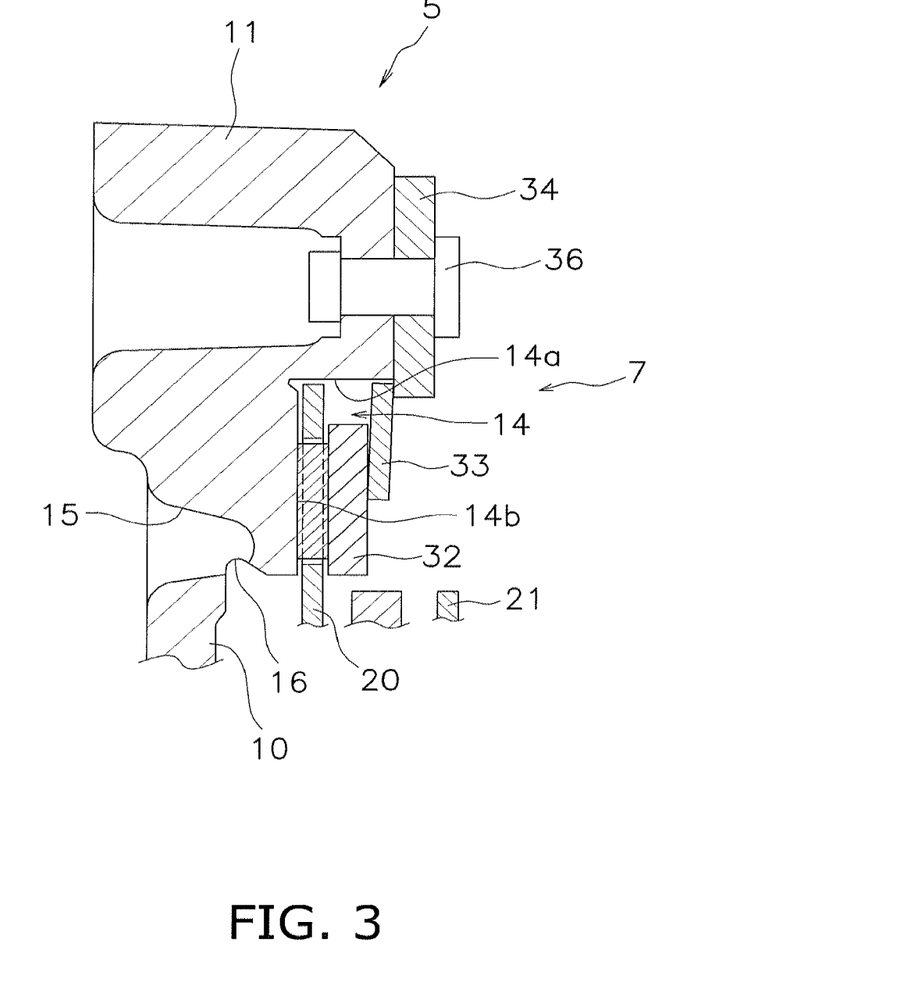
FIG. 3 is an enlarged view of a transmission torque limiting part of the torque limiter.

As illustrated in FIGS. 1 to 3, the transmission torque limiting part 7 includes the aforementioned friction members 26, a pressure ring 32, a cone spring 33 and a cover member 34 as a support member. The pressure ring 32 herein holds the friction members 26 with the friction coupling surface 14b of the flywheel 5 while the friction members 26 are interposed therebetween. The pressure ring 32 and the cone spring 33, together with the friction members 26, are accommodated in the accommodation portion 14 of the flywheel 5.

Figure 4:
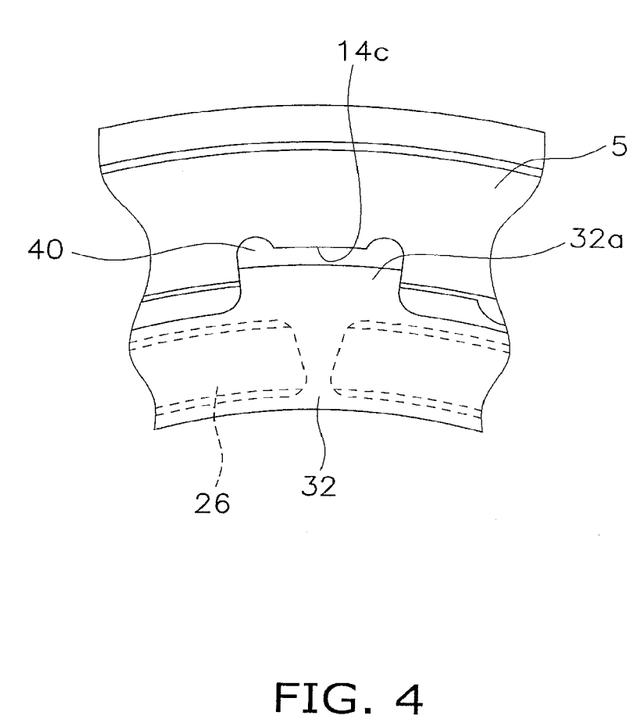
FIG. 4 is a partial enlarged view of FIG. 2.

The pressure ring 32 is a ring-shaped plate member. The pressure ring 32 includes a plurality of radial-outwardly protruded engaging protrusions 32a on the radial outer portion thereof. On the other hand, the accommodation portion 14 of the flywheel 5 includes a plurality of engaging recesses 14c on the outer peripheral surface thereof, as illustrated in an enlarged view of FIG. 4. The engaging recesses 14c are aligned at equal intervals along the circumferential direction of the accommodation portion 14. The engaging protrusions 32a of the pressure ring 32 are respectively engaged with the engaging recesses 14c of the flywheel 5 on a one-to-one basis. Accordingly, the pressure ring 32 is prevented from rotating relatively to the flywheel 5 but is allowed to move in the axial direction.

As described above, the cone spring 33 is accommodated in the accommodation portion 14 of the flywheel 5, while the radial inner portion thereof presses the pressure ring 32 towards the flywheel 5.

The cover member 34 is a ring-shaped plate member fixed to the transmission-side end surface of the mass portion 11 of the flywheel 5 by means of a plurality of rivets 36. Further, the cover member 34 supports the radial outer portion of the cone spring 33. In other words, the inner diameter of the cover member 34 is less than the outer diameter of the cone spring 33.

The cover member 34 and the pressure ring 32 are herein made of a single ring-shaped plate member. Therefore, the cover member 34 includes a plurality of radial-outwardly directed recesses 34a (see FIG. 2) on the inner peripheral edge thereof. Specifically, the pressure ring 32 is punched from the single ring-shaped plate member by means of stamping. Accordingly, the remaining part (i.e., the cover member 34) of the single-shaped plate member includes the recesses 34a arranged to be matched with the engaging protrusions 32a. The recesses 34a function as flow paths 40 (see FIG. 4) communicating the outside of the torque limiter 1 and the radial outer portion of the clutch plate 20 that the friction members 26 are disposed. Therefore, it is possible to discharge mud water and the like, entering the radial outer portion of the clutch plate 20, to the outside through the flow paths 40.

In the aforementioned structure, transmittable torque is determined by the urging force of the cone spring 33, the friction coefficients of the friction members 26, and the effective radius of the friction coupling portion. When a torque greater than the transmittable torque is inputted from the engine side, slippage occurs in the friction coupling portion and the transmission torque is thereby limited to a predetermined torque.

Assembling and Attachment of Torque Limier

In assembling the aforementioned torque limiter, the clutch disc assembly 6 is required to be preliminarily assembled. Next, the bolts 12 are inserted into the bolt attachment holes of the flywheel 5. Subsequently, the clutch disc assembly 6, the pressure ring 32 and the cone spring 33 are sequentially disposed in this order in the accommodation portion 14 of the flywheel 5. Finally, the cover member 34 is fixed to the flywheel 5 by means of the rivets 36.

The torque limiter with the flywheel is thus obtained. The clutch disc assembly 6 and the flywheel 5, forming the main body of the torque limiter, are appropriately positioned in the radial direction by the outer peripheral edge of the clutch plate 20 and the radial positioning surface 14a of the flywheel 5. In other words, the axes of the flywheel 5 and the spline engaging hole 28a of the clutch disc assembly 6 are aligned before the flywheel 5 and the clutch disc assembly 6 are fixed onto the crankshaft 2.

Thus obtained torque transmitter with the flywheel is attached onto the crankshaft 2. Specifically, the spigot ferrule 2a of the crankshaft 2 is fitted into the hole 5a formed in the center of the flywheel 5. Accordingly, the torque limiter is entirely set on the crankshaft 2. Next, the plural bolts 12 are respectively screwed into the screw holes formed on the axial end surface of the crankshaft. The tightening tool is then inserted into each of the holes 29a formed in the hub flange 29 of the spline hub 22 and the tip thereof is locked with the hexagon socket formed on the head of each bolt 12 for receiving the tightening tool. Each bolt 12 is thus tightened and fixed therein by means of the tightening tool.

Detachment of Torque limiter

Figure 7A:
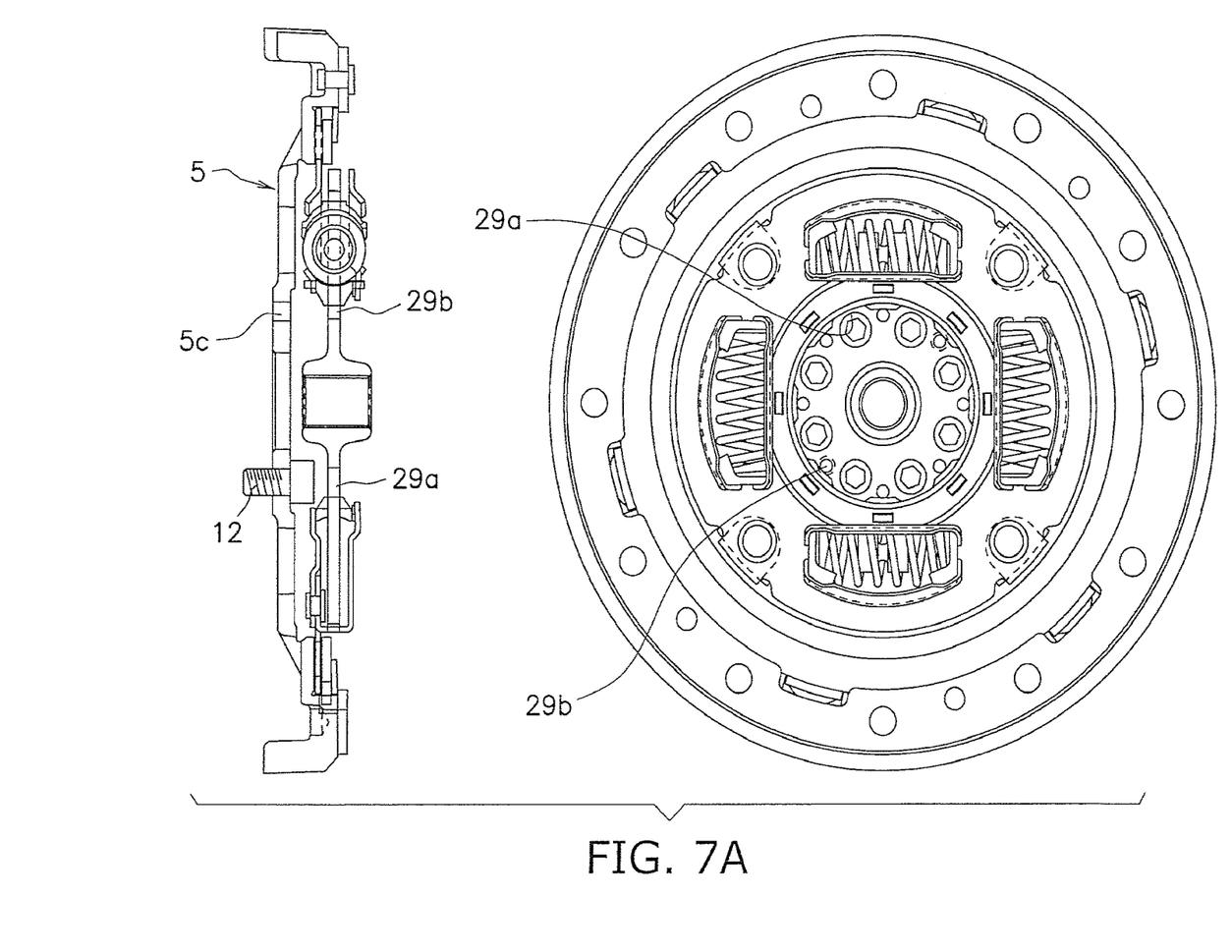
FIG. 7A is a diagram for explaining a torque limiter detachment procedure.

Thus attached torque limiter can be detached in the following procedure. It should be noted that the hub flange 29 of the spline hub 22 includes four holes 29b that a pin is inserted for detaching the attached torque limiter as illustrated in diagrams of FIG. 7A and thereafter. The holes 29b are herein arranged at equal intervals of 90 degrees. Likewise, the flywheel 5 includes four holes 5c arranged to be matched with the holes 29b. In FIG. 7A, "tool inserting holes" to be described correspond to the aforementioned holes 29a formed in the hub flange 20 of the spline hub 22 for allowing the tool to be inserted. As is obvious from FIG. 7A, when the phase of the pin inserting holes 29b and that of the pin inserting holes 5c of the flywheel 5 are matched (i.e., their circumferential positions are matched), the phase of the tool inserting holes 29a and that of the bolts 12 are also matched.

First, FIG. 7A illustrates a state immediately after attachment of the torque limiter. Under the condition, the phase of the tool inserting holes 29a of the spline hub 22 and that of the bolts 12 are matched. In other words, each bolt 12 can be screwed by means of the tool inserted through the corresponding one of the tool inserting holes 20a.

Figure 7B:
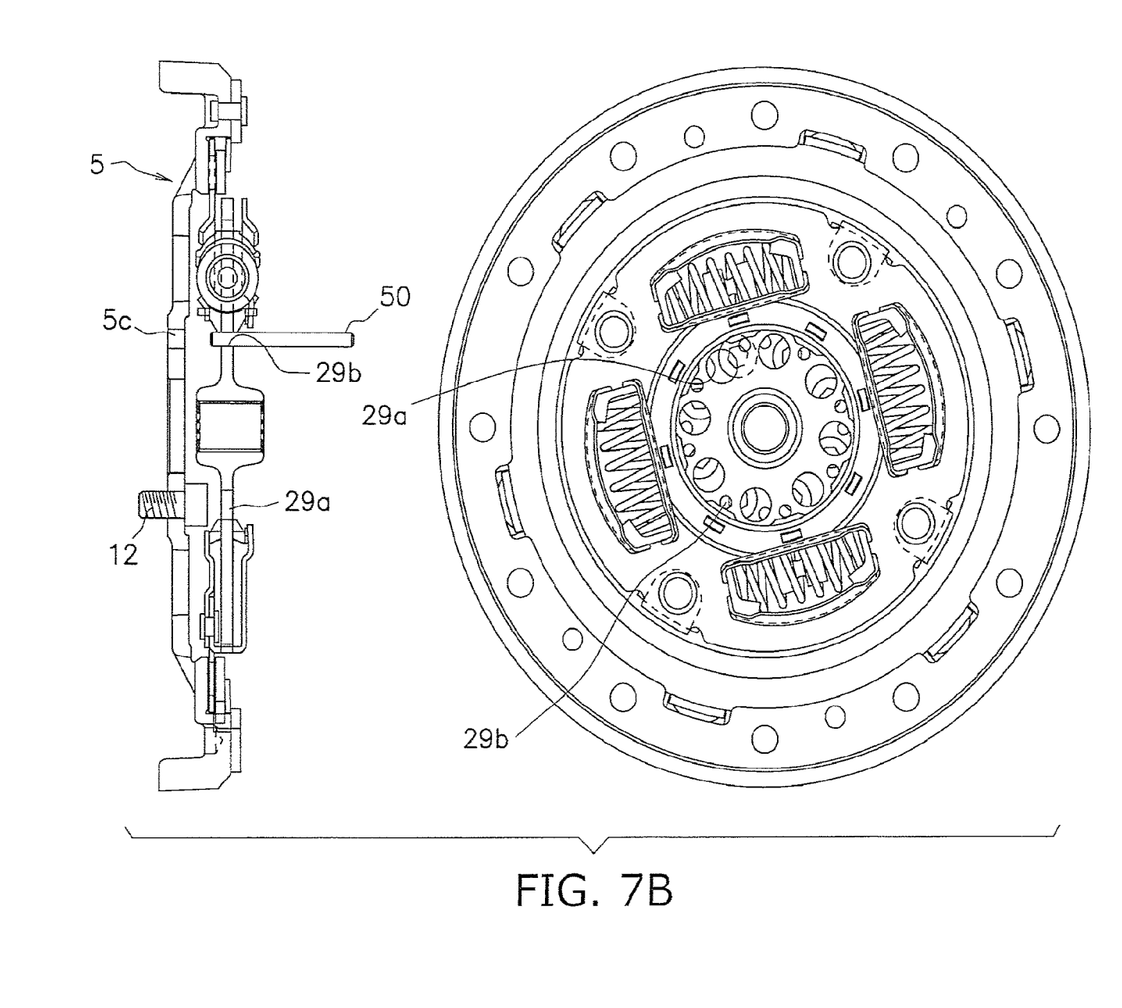
FIG. 7B is a diagram for explaining the torque limiter detachment procedure.

As illustrated in FIG. 7B, on the other hand, the phase of the tool inserting holes 29b and that of the bolts 12 are misaligned (i.e., their circumferential positions are not matched) when the clutch disc assembly 6 is rotated with respect to the flywheel 5 in conjunction with activation of the torque limiter. In this case, two pins 50 are firstly inserted into two of the pin inserting holes 29b. The pins 50 are herein kept inserted into the holes 29b without being deeply inserted therein for avoiding the tips thereof from making contact with the bolts 12 even when the clutch disc assembly 6 is rotated.

Figure 7C:
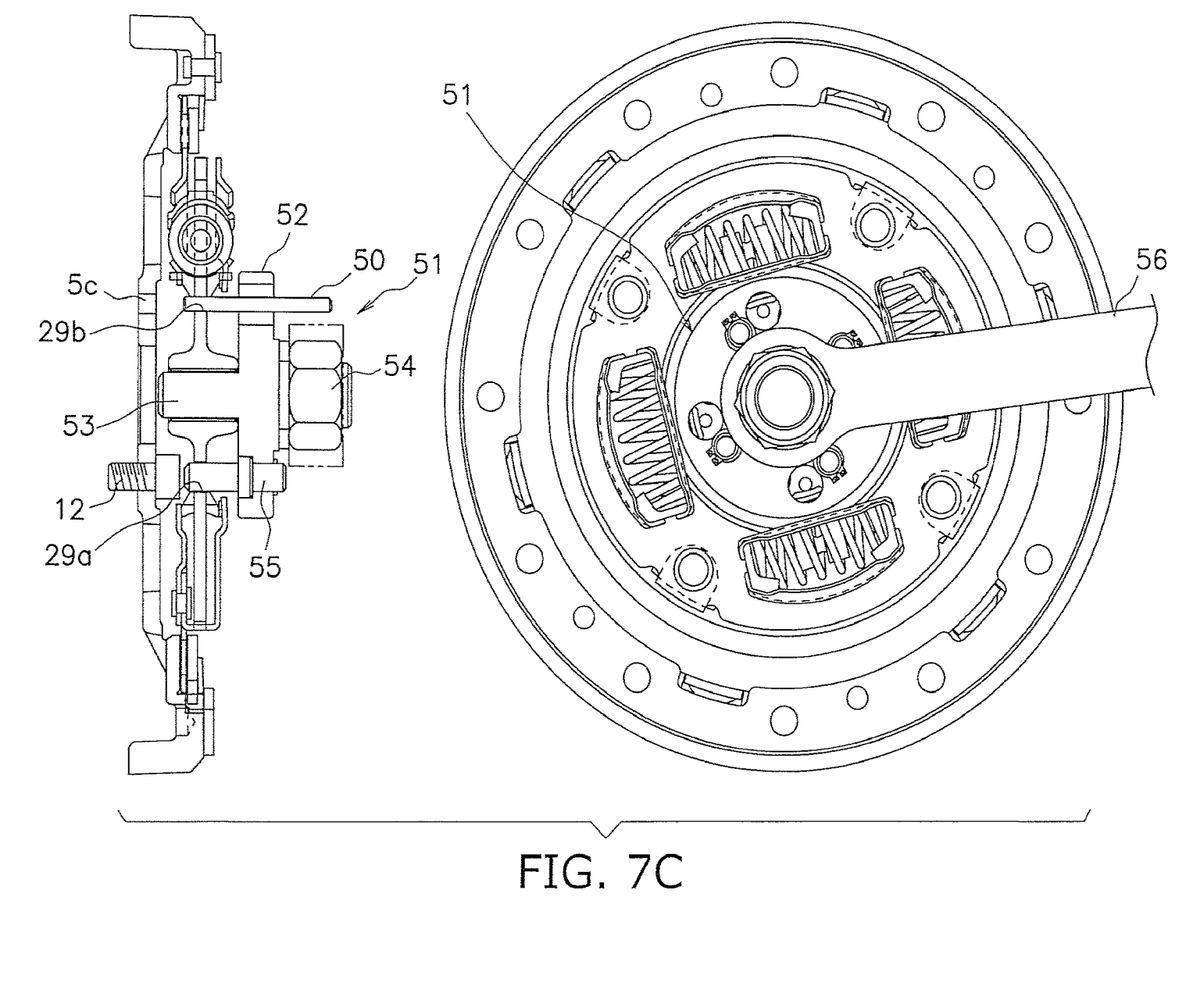
FIG. 7C is a diagram for explaining the torque limiter detachment procedure.

Next, a jig 51 is prepared as illustrated in FIG. 7C. The jig 51 includes a flanged portion 52, a spline shaft 53 and a nut portion 54. The spline shaft 53 is formed on one face of the flanged portion 52. The nut portion 54 is formed on the other face of the flanged portion 52. The flanged portion 52 includes four holes for allowing the pins 50 to pass therethrough. Further, an alignment pin 55 is fixed to the flanged portion 52. The alignment pin 55 can be inserted into each tool inserting hole 29a. The outer diameter of the pin 55 is roughly the same as the inner diameter of each hole 29a.

The aforementioned jig 51 is set as illustrated in FIG. 7C and the nut portion 54 is rotated by means of a tool 56. The damper disc assembly 6 is accordingly rotated. Rotation of the damper disc assembly 6 is then stopped under the condition that positions of the pins 50 are matched with two of the pin inserting holes 5c of the flywheel 5. The pins 50 are herein deeply inserted and fitted into two of the pin inserting holes 5c of the flywheel 5.

It is judged whether or not the positions of the pins 50 are matched with those of two of the pin inserting holes 5c of the flywheel by observing the pin inserting holes 5c of the flywheel 5 through the remaining pairs of the hole of the flanged portion 52c and the pin inserting hole 29b of the spline hub 22 in which the pins 50 are not inserted.

Figure 7D:
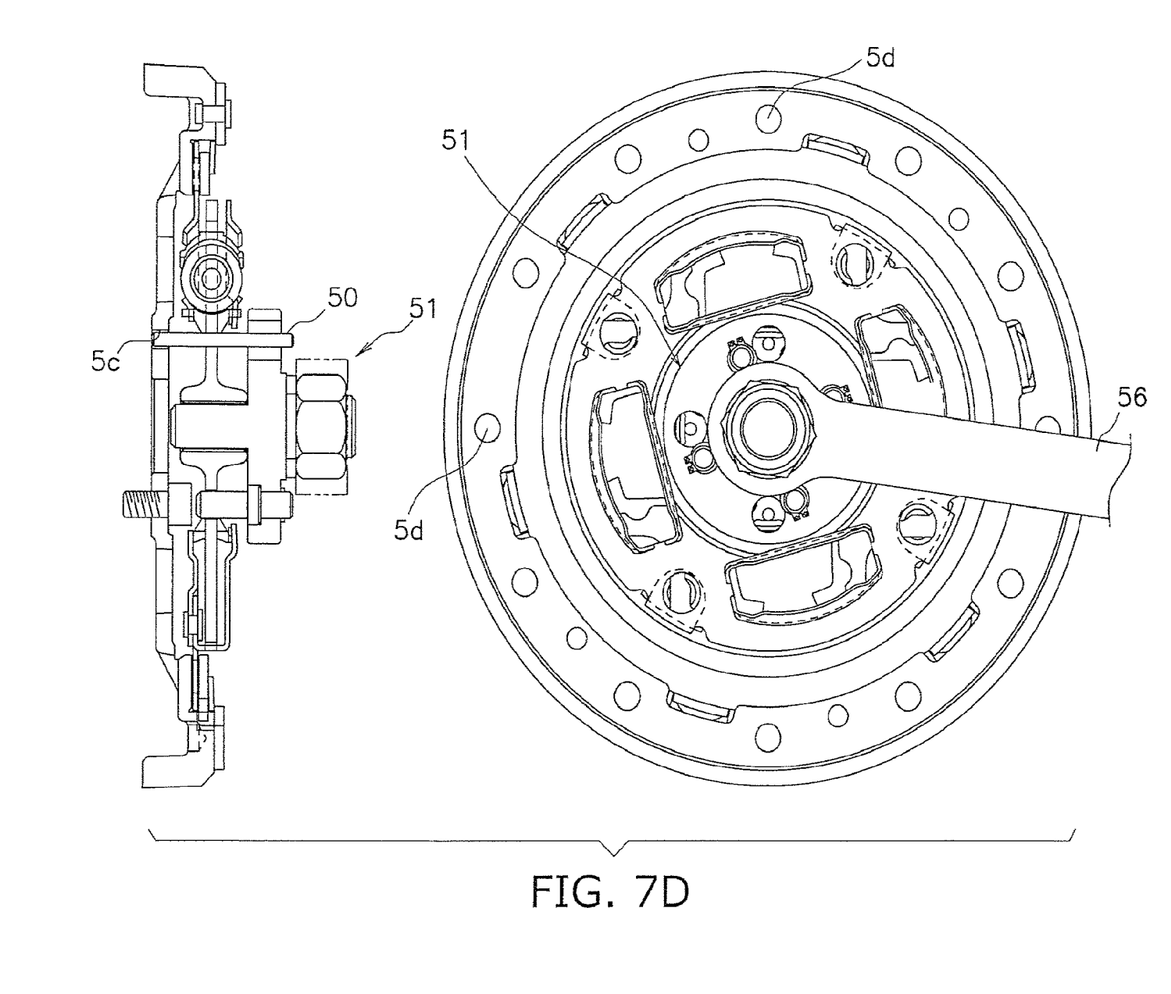
FIG. 7D is a diagram for explaining the torque limiter detachment procedure.

Further, the flywheel 5 includes alignment markings 5d formed or attached thereon. It is also possible to judge that the positions of the pins 50 are matched with two of the pin inserting holes 5c of the flywheel by matching the phase of the alignment markings 5d and that of the pin inserting holes 29b.

Figure 7E:
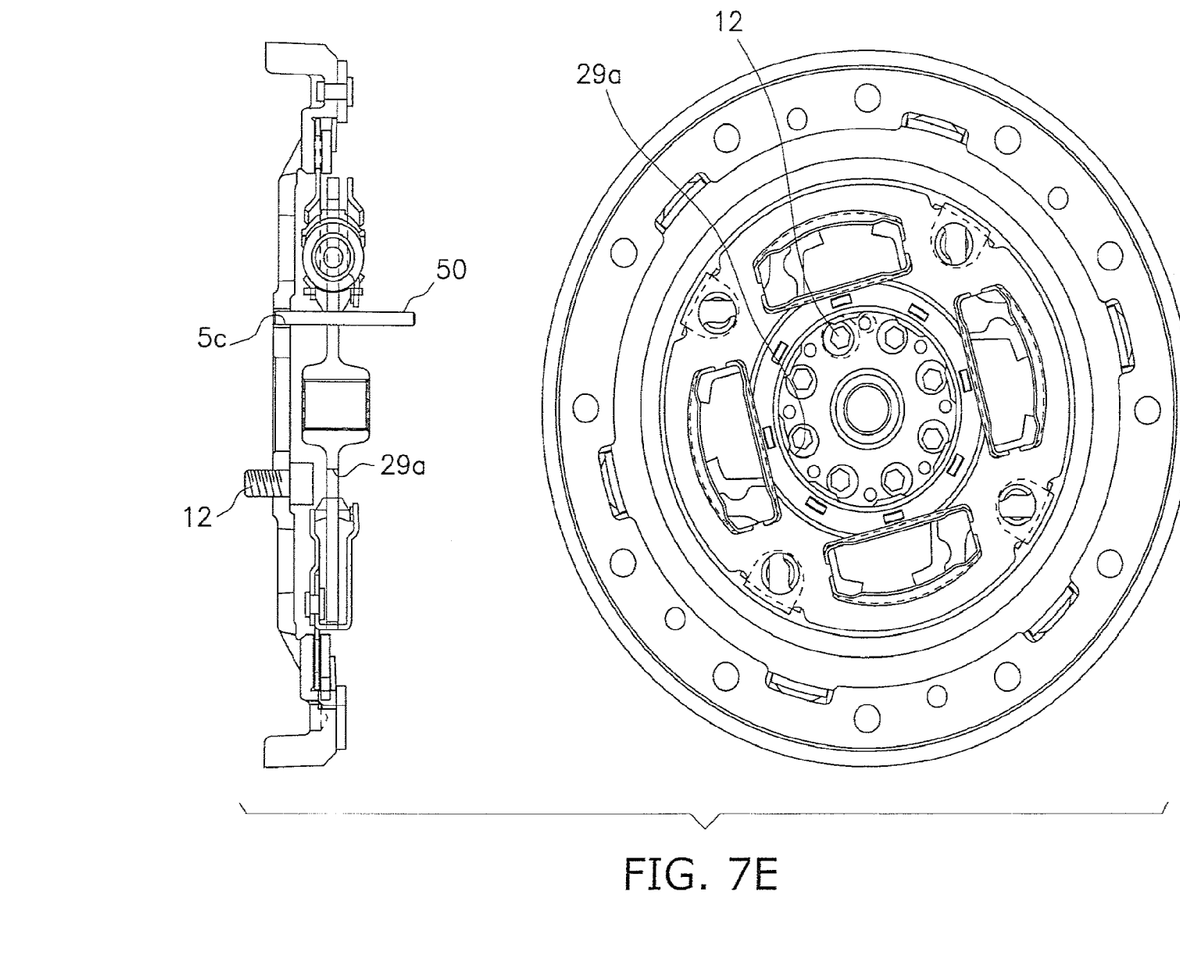
FIG. 7E is a diagram for explaining the torque limiter detachment procedure.

The jig 51 is detached under the condition that the phase of the pins 50 and that of the pin inserting holes 5c of the flywheel 5 are matched as described above. FIG. 7E illustrates the state of the torque limiter that the jig 51 is detached. The phase of the clutch disc assembly 6 is herein locked by means of the pins 50. Therefore, the phase of the flywheel 5 and that of the clutch disc assembly 6 are prevented from being misaligned even when the jig 51 is detached therefrom. Under the condition, each bolt 12 is loosened by means of the tool inserted through the corresponding one of the tool inserting holes 29a. The torque limiter with the flywheel is then detached from the crankshaft 2.

Features (1) The friction members 26 are attached and fixed in the holes 20b formed in the clutch plate 20. Therefore, the friction members can be fixed to the plate at a lower cost, compared to the well-known fixing methods using rivets, adhesive materials or molding. Further, the axial size of the torque limiter can be reduced.

(2) The radial outer portion of the clutch plate 20 functions as a friction coupling plate. Therefore, the torque limiter can be more simply structured. Especially, the axial size of the torque limiter can be further reduced.

(3) The flywheel 5 has been preliminarily embedded in the torque limiter. Therefore, the entire torque limiter, including components such as the flywheel 5 and the spline hub 22, can be attached onto the crankshaft 2 while the axis misalignment between the flywheel 5 and the spline hole 28a of the spline hub 22 is set to fall in a predetermined range. Therefore, the attachment work of the torque limiter can be easily done. In addition, no work is required for aligning the axes of the crankshaft 2 and the spline hub 22.

Specifically, the axis of the flywheel 5 can be aligned with the axis of the crankshaft 2 by means of the hole 5a formed in the center of the flywheel 5. Further, the axes of the flywheel 5 and the spline hole 28a of the spline hub 22 are aligned. Therefore, no structure and work is required for aligning the axes of the crankshaft 2 and the spline hole 28a of the spline hub 22.

(4) In the transmission torque limiting part 7, the torsion springs 23 and the pair of the clutch plate 20 and the retaining plate 21 are disposed radial outwards of the pitch circle of the bolts attached to the flywheel 5. In other words, components are concentratedly disposed on the radial outer side. Therefore, the torque limiter can be formed in a lightweight structure. Further, the torque limiter can obtain relatively large inertia of moment in spite of the lightweight structure thereof.

(5) The bolts 12 have been preliminarily attached to the flywheel 5. Therefore, no space is required for inserting the bolts 12 into the attachment holes of the flywheel 5 in the post-processing steps. Accordingly, the axial size of the toque limiter can be reduced.

(6) The axis of the clutch disc assembly 6 is aligned with the crankshaft 2 while the outer peripheral edge of the clutch plate 20 is abutted to the radial positioning surface 14a of the flywheel 5. Therefore, it is not required to extend the radial inner portion of the clutch plate 20 to the boss 28 of the spline hub 22 as structured in the well-known torque limiters. Accordingly, only the spline hub 22 is disposed radial inwards of the flywheel 5 on the transmission side. In other words, the flywheel 5 can be fixed onto the crankshaft 2 with a simple structure.

Other Exemplary Embodiments

The present invention is not limited to the aforementioned exemplary embodiment, and a variety of changes and modifications can be made without departing from the scope of the present invention.

Figure 5:
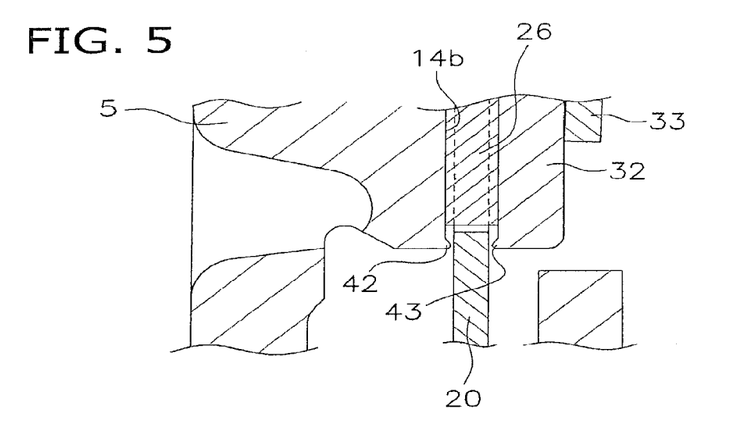
FIG. 5 is a partial enlarged cross-sectional view of a torque limiter according to another exemplary embodiment of the present invention.

(a) As illustrated in FIG. 5, the friction coupling surface 14b of the flywheel 5 may include an annular protrusion 42 on the inner peripheral edge thereof. Likewise, the pressure ring 32 may include an annular protrusion 43 on the inner peripheral edge thereof. The protrusions 42 and 43 are disposed adjacent to the inner peripheral edges of the friction members 26. Further, the protrusions 42 and 43 are disposed adjacent to the faces of the clutch plate 20 while being separated at a predetermined interval. It should be noted that at least one of the flywheel 5 and the pressure ring 32 may include the protrusion.

The aforementioned protrusions 42 and 43 can inhibit mud water and the like, moving from the inner peripheral side, from entering the parts including the friction members 26. Therefore, abrasion and slippage of the friction members 26 can be inhibited.

Figure 6:
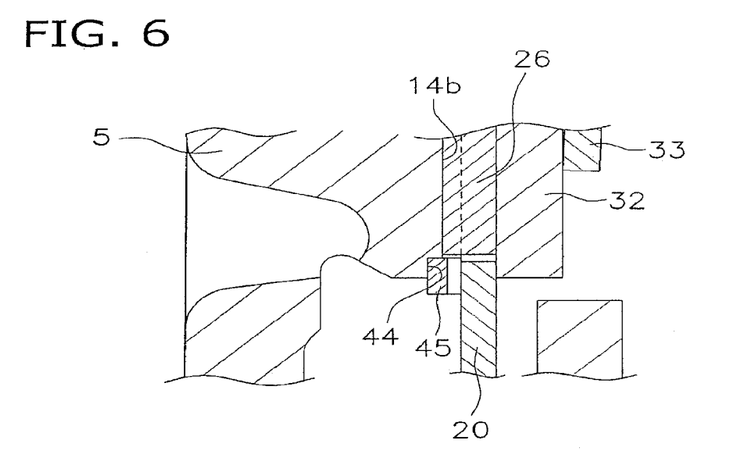
FIG. 6 is a partial enlarged cross-sectional view of a torque limiter according to yet another exemplary embodiment of the present invention.

(b) FIG. 6 illustrates yet another exemplary embodiment of the present invention. In this case, the friction coupling surface 14b of the flywheel 5 includes an annular notch 44 on the inner peripheral edge thereof. Further, a wave washer 45 is disposed on the notch 44. In other words, the wave washer 45 is disposed radial inwards of the friction members 26 while being interposed between the flywheel 5 and the clutch plate 20. The wave washer 45 urges the clutch plate 20 in a direction away from the flywheel 5 (i.e., towards the pressure ring 32).

The axial movement of the clutch plate 20 can be herein inhibited by the urging force of the wave washer 45. It is thereby possible to inhibit abrasion and abnormal noise production of the respective components that may be caused by the axial movement (i.e., vibrations) of the clutch plate 20.

It should be noted that the member for urging the clutch plate 20 is not limited to the wave washer and may be an elastic member made of resin or the like.

(c) The hole 5a, formed in the center of the flywheel 5, is engaged with the spigot ferrule 2a of the crankshaft 2 in aligning the axis of the flywheel 5 with that of the crankshaft 2. However, a knock pin may be used for aligning the axes of the flywheel 5 and the crankshaft 2.

(d) It is not required to preliminarily attach the bolts 12 to the flywheel 5 when larger holes than the holes 29a of the aforementioned exemplary embodiment can be formed in the hub flange 29 of the spline hub 22.

(e) The shape and the number of the friction members are not limited to those in the aforementioned exemplary embodiment. For example, a plurality of friction members may be respectively formed in a circular shape.

INDUSTRIAL APPLICABILITY

According to the aforementioned present invention, the friction members can be fixed in the torque limiter with a simple structure at a low cost.

Advantageous Effects of the Invention

According to the aforementioned present invention, the single or plurality of friction members can be fixed in the torque limiter with a simple structure at a low cost. Further, according to the present invention, the obtained torque limiter can be easily attached to the engine side and does not require an axis-aligning work for post-attachment radial positioning. Yet further, according to the present invention, the torque limiter includes the drive member preliminarily attached thereto and the entire torque limiter is designed to be fixed to the engine-side member. Therefore, the torque limiter can be easily attached onto the crankshaft. In addition, radial positioning of the torque limiter can be appropriately done.

The invention claimed is:

1. A torque limiter configured to limit a torque to be transmitted from an engine-side member to a transmission-side shaft, comprising:
   a drive member coupled to the engine-side member, the drive member including a friction coupling surface;
   an input-side plate including
      a radial outer portion configured adjacent to the friction coupling surface, the radial outer portion axially having a first thickness, the radial outer portion including first and second holes axially penetrating therethrough,
      first and second friction members configured in the first and second holes respectively, each of the first and second friction members having a second thickness greater than the first thickness; and
      a window hole configured in a radial inner portion of the radial outer portion;
   an output-side member configured to be engaged with the transmission-side shaft;
   a damper mechanism circumferentially elastically coupling the input-side plate and the output-side member; and
   a transmission torque limiting part configured to limit a torque to be transmitted from the drive member to the transmission-side shaft, with the first and second friction members being interposed and held between the transmission torque limiting part and the friction coupling surface of the drive member,
   the transmission torque limiting part including a pressure ring pressing the first and second friction members onto the friction coupling surface of the drive member,
   either the pressure ring or the friction coupling surface of the drive member including a protrusion protruding closer to one of faces of the input-side plate,
   the protrusion being disposed radial inwards of the first and second friction members.

2. The torque limiter recited in claim 1, wherein
   the radial outer portion includes a third hole axially penetrating therethrough,
   the input-side plate includes a third friction member configured in the third hole, where the third friction member has the second thickness,
   a distance between the first and second holes is equal to a distance between the second and third holes.

3. The torque limiter recited in claim 2, wherein
   each of the first, second, and third friction members is press-fitted in the first, second, and third holes without producing a circumferential clearance therein.

4. The torque limiter recited in claim 1, wherein
the transmission torque limiting part includes
a pressure ring holding the first and second friction members with the friction coupling surface of the drive member, with the first and second friction members being interposed therebetween;
a ring-shaped cone spring including a radial inner portion configured to press the pressure ring towards the drive member, and
a support member attached to the drive member to support a radial outer portion of the cone spring.

5. A torque limiter configured to limit a torque to be transmitted from a crankshaft of an engine to a transmission-side shaft, the torque limiter comprising:
a disc-shaped drive member including a friction coupling surface, the disc-shaped drive member allowed to be coupled to an end of the crankshaft, the disc-shaped drive member including first and second attachment holes circumferentially aligned on a radial inner portion thereof, the attachment holes allowing first and second fasteners for fixation to be inserted the first and second attachment holes;
an input-side member including a friction member on a radial outer portion thereof;
an output-side member including an engaging portion be engaged with the transmission-side shaft;
a damper mechanism circumferentially elastically coupling the input-side member and the output-side member; and
a transmission torque limiting part configured to limit a torque to be transmitted from the drive member to the transmission-side shaft, with the friction member of the input-side member being interposed and held between the transmission torque limiting part and the friction coupling surface of the drive member,
the input-side member and the damper mechanism being disposed radial outwards of a pitch circle diameter of the first and second attachment holes of the drive member,
no other member excluding the output-side member being disposed radial inwards of the pitch circle diameter,
the engaging portion of the output-side member having an axis misalignment of less than or equal to 1.0 mm with respect to a positioning portion which regulates a location of the drive member.

6. The torque limiter recited in claim 5, wherein
the drive member includes the positioning portion for executing radial positioning thereof with respect to the crankshaft.

7. The torque limiter recited in claim 5, further comprising
the first and second fasteners are inserted into the first and second attachment holes respectively.

8. The torque limiter recited in claim 7, wherein
the output-side member includes a boss having a spline joint portion in a center part thereof, and a flange extending radial outwards from the boss,
the flange includes a tool inserting hole allowing a tightening tool to be inserted therein for fixing the first and second fasteners for fixation respectively inserted into the first and second attachment holes of the drive member to the crankshaft by the tightening tool.

9. A torque limiter configured to limit a torque to be transmitted from a crankshaft of an engine to a transmission-side shaft, the torque limiter comprising:
a disc-shaped drive member including a friction coupling surface on a radial outer portion thereof, the disc-shaped drive member configured to be coupled to an end of the crankshaft;
a disc-shaped input-side member including a friction member on a radial outer portion thereof;
an output-side member including an engaging portion configured to be engaged with the transmission-side shaft;
a damper mechanism circumferentially elastically coupling the input-side member and the output-side member; and
a transmission torque limiting part configured to limit a torque to be transmitted from the drive member to the transmission-side shaft, with the friction member of the input-side member being interposed and held between the transmission torque limiting part and the friction coupling surface of the drive member,
the drive member including an axially extended abutment portion on the radial outer portion thereof for radial positioning thereof, and
an outer peripheral edge of the input-side member being abutted to the abutment portion of the drive member for radial positioning of the input-side member, the output-side member, and the damper mechanism,
the drive member including first and second attachment holes circumferentially aligned on a radial inner portion thereof, the first and second attachment holes allowing first and second fasteners for fixation to be inserted respectively,
the input-side member and the damper mechanism being disposed radial outwards of a pitch circle diameter of each of the first and second attachment holes of the drive member,
no other member excluding the output-side member being disposed radial inwards of the pitch circle diameter,
the engaging portion of the output-side member having an axis misalignment of less than or equal to 1.0 mm with respect to a positioning portion which regulates a location of the drive member.

10. The torque limiter recited in claim 9, wherein
the drive member includes a tubular inner peripheral surface axially extending, and
the abutment portion for the radial positioning is formed on the tubular inner peripheral surface.

11. The torque limiter recited in claim 10, wherein
the tubular inner peripheral surface includes a first engaging portion on an axial transmission side of the abutment portion,
the transmission toque limiting part includes
a pressure ring holding the friction member with the friction coupling surface of the drive member, with the friction member being interposed therebetween;
a ring-shaped cone spring including a radial inner portion pressing the pressure ring towards the drive member, and
a support member attached to the drive member for supporting a radial outer portion of the cone spring; and
the pressure ring including a second engaging portion on a radial outer portion thereof, the second engaging portion being engaged with the first engaging portion to prevent the pressure ring from rotating relative to the drive member.

12. A torque limiter configured to limit a torque to be transmitted from an engine-side member to a transmission-side shaft, the torque limitter comprising:
a drive member coupled to the engine-side member, the drive member including a friction coupling surface;

a friction coupling plate including
    a plate body having a hole axially penetrating therethrough, the plate body having a first thickness in an axial direction, and
    a friction member attached to the hole of the friction coupling plate, the friction member having a second thickness greater than the first thickness;
an output-side member configured to be engaged with the transmission-side shaft;
a damper mechanism circumferentially elastically coupling the friction coupling plate and the output-side member; and
a transmission torque limiting part configured to limit a torque to be transmitted from the drive member to the transmission-side shaft, with the friction member being interposed and held between the transmission torque limiting part and the friction coupling surface of the drive member,
the transmission torque limiting part including a pressure ring pressing the friction member onto the friction coupling surface of the drive member,
either the pressure ring or the friction coupling surface of the drive member including a protrusion protruding closer to a face of the friction coupling plate, the protrusion disposed radial inwards of the friction member.

* * * * *